(12) United States Patent
Marmaropoulos et al.

(10) Patent No.: US 7,559,768 B2
(45) Date of Patent: Jul. 14, 2009

(54) MODULAR WEARABLE CIRCUIT

(75) Inventors: George Marmaropoulos, Yorktown Heights, NY (US); Giang Vu, Peekskill, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 66 days.

(21) Appl. No.: 11/576,046

(22) PCT Filed: Sep. 22, 2005

(86) PCT No.: PCT/IB2005/053135

§ 371 (c)(1),
(2), (4) Date: Mar. 27, 2007

(87) PCT Pub. No.: WO2006/035385

PCT Pub. Date: Apr. 6, 2006

(65) Prior Publication Data

US 2008/0026354 A1    Jan. 31, 2008

Related U.S. Application Data

(60) Provisional application No. 60/614,375, filed on Sep. 29, 2004.

(51) Int. Cl.
H01R 33/00    (2006.01)
(52) U.S. Cl. .................. 439/37; 2/69; 434/301
(58) Field of Classification Search .............. 439/37; 219/211; 2/102, 69; 434/301; 340/572.1
See application file for complete search history.

(56) References Cited

U.S. PATENT DOCUMENTS

| 1,691,472 | A | * | 11/1928 | Graham et al. ............... 219/211 |
| 3,656,242 | A | | 4/1972 | Atkinson |
| 4,376,538 | A | | 3/1983 | Keenan |
| 5,717,999 | A | * | 2/1998 | Lurry ............................. 2/69 |
| 5,742,486 | A | | 4/1998 | Yangkuai |
| 5,868,723 | A | | 2/1999 | Al-Sabah |
| 5,906,004 | A | * | 5/1999 | Lebby et al. ......................... 2/1 |
| 6,324,053 | B1 | * | 11/2001 | Kamijo ......................... 361/683 |
| 6,561,814 | B2 | * | 5/2003 | Tilbury et al. .................. 439/37 |
| 6,563,424 | B1 | * | 5/2003 | Kaario ..................... 340/572.1 |
| 7,344,379 | B2 | * | 3/2008 | Marmaropoulos et al. .... 439/37 |

FOREIGN PATENT DOCUMENTS

FR    2545204    11/1984
FR    2758268    7/1998

* cited by examiner

Primary Examiner—Hae Moon Hyeon

(57) ABSTRACT

A modular wearable circuit suitable for demonstrating basic principles and/or concepts of electronics and electronic components by providing any number of the garments that can cooperate as a set to define a variety of different circuits capable of performing electrical or electronic functions. Each garment includes an integrated conductive network connected to one or more conductive connection points and one or more electronic components. Each garment represents and operates as at least one electronic component and is cooperative with one or more complementary garments to define one or more electronic circuits capable of performing an assortment of electronic operations.

20 Claims, 4 Drawing Sheets

MODULAR WEARABLE CIRCUIT

CROSS REFERENCE TO RELATED APPLICATION

This application claims the benefit of U.S. Provisional Application Ser. No. 60/614,375 filed Sep. 29, 2004, and International Application No. PCT/IB2005/053135, filed Sep. 22, 2005, which are incorporated herein on whole by reference.

The present disclosure is directed generally to smart garments. More particularly, the present disclosure is directed to a smart garment system suitable for constructing electrical circuits with various modular interconnecting components so as to accomplish different electronic operations.

It is known to utilize a variety of educational devices and/or games to entertain and educate students and others in the construction of electronic circuits and the use of various electrical and electronic components associated therewith. Educational researchers have found that one effective way to teach people, and more particularly children, is to get them involved as much as possible in the learning process. Accordingly, a number of different student-participating educational kits have been developed over the years. See U.S. Pat. Nos. 3,656,242; 4,376,538; and 5,742,486 for examples of educational kits intended to teach abstract concepts that might otherwise be difficult to understand. These kits, with their simplified components, provide means for building a variety of basic electrical or electronic circuits so as to be particularly useful in teaching elementary electronics and circuit design. However, despite the fact that many of these known educational kits are relatively simple, they often are still inappropriate for use in teaching younger children, and further for use in many group learning situations such as are often found in the school setting. There is thus a need to provide an educational tool that can be used in an intuitive and engaging manner to demonstrate and teach basic principles and/or concepts associated with electronics and electronic components.

The present invention addresses disadvantages and/or shortcomings associated with educational tools utilized to demonstrate and teach basic principles and/or concepts of electronics and electronic components by providing any number of garments that can cooperate as a set to define a variety of different circuits capable of performing electrical or electronic functions.

In an illustrative aspect of the present disclosure, a garment is a smart garment having a conductive network that is operatively integrated into the garment so as to be connected to one or more conductive connection points and one or more electronic components operatively associated with each garment. A beneficial feature of the present invention in found in that the garment represents and operates as the one or more electronic components associated therewith so as to cooperate with one or more complementary garments to define one or more electronic circuits.

Another illustrative aspect of the present disclosure involves a modular wearable circuit defined by a set of cooperating garments with integrated electronic functions associated therewith so that each garment represents and operates as at least one electronic component. The various garments advantageously cooperatively connect so as to define any of a variety of different circuits capable of performing an assortment of electronic operations.

Still another illustrative aspect of the present disclosure is directed to a method of forming an electrical circuit that includes the steps of: (i) providing a set of cooperating garments having integrated electronic functions associated therewith so that each garment can operate as and represent at least one electronic component; and (ii) conductively connecting the different garments so as to arrange the electronic components thereof to define an operative circuit.

Additional and/or alternative aspects, features and advantages of the present invention will become apparent with reference to the following detailed description of various exemplary embodiments thereof.

For a better understanding of the present invention, reference is made to the following detailed description considered in conjunction with the accompanying drawings, in which:

FIG. 5b is an enlarged view of the mating engagement of FIG. 5a;

Figure 1:
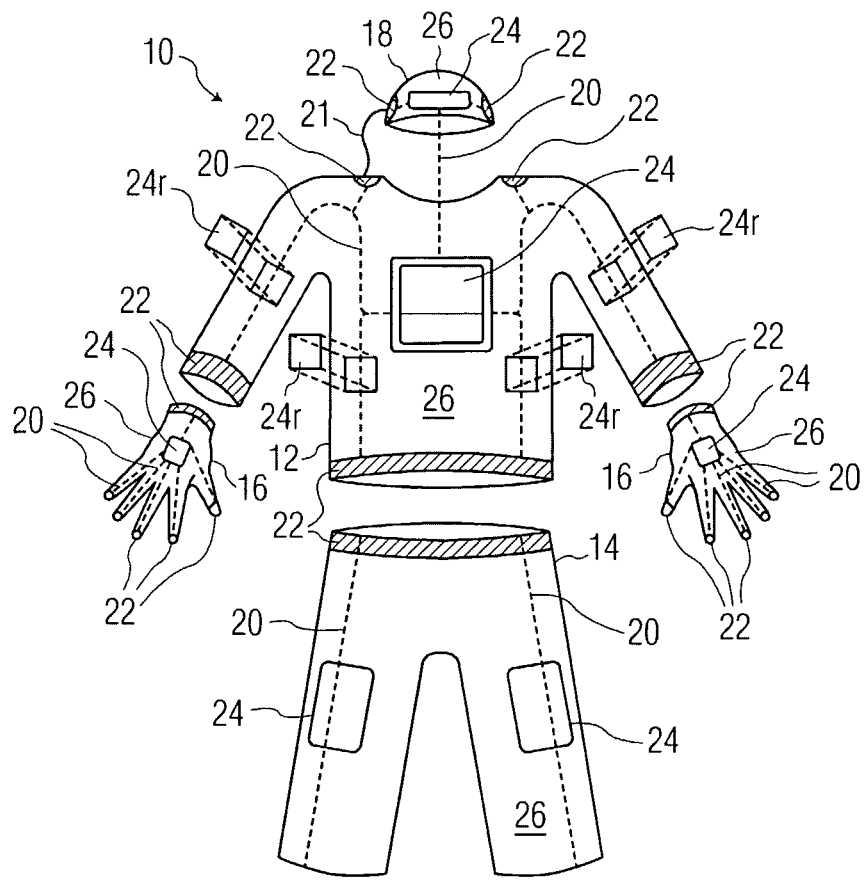
FIG. 1 is a schematic illustration of various garments according to an exemplary embodiment of the present invention.

Referring to the drawings and in particular to FIG. 1, there is shown by way of illustrative example various garments in accordance with the present invention generally represented by reference numeral 10. As shown, the garments 10 can take any of a variety of forms including, for example, shirts 12, pants 14, gloves 16 and/or hats 18. Additional or alternative garments may equally be used. Each garment 10 is provided with a conductive network 20 connecting two or more conductive connection points 22. The conductive network 20 includes at least one electronic component 24 preferably integral or embedded into the garment 10 so that such garment represents and operates as the component 24.

Figure 2:
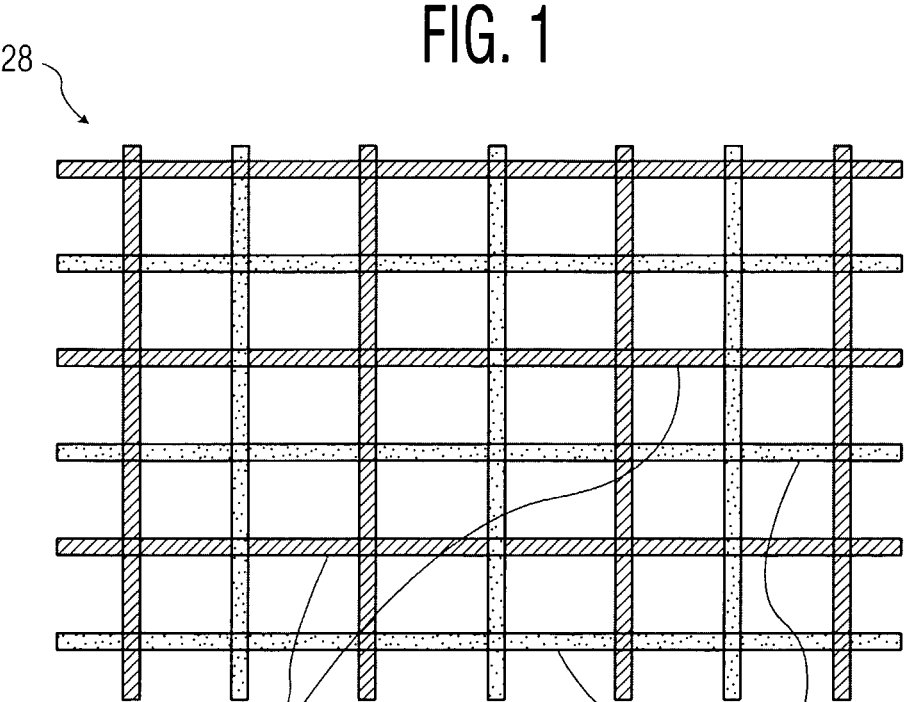
FIG. 2 is a plan view of a fiber construction in accordance with an aspect of the present invention.

The conductive network 20 can be fashioned in a variety of ways. For example, the conductive network 20, or at least a part thereof, can be printed conductive ink preferably integrally associated with a surface 26 of the garment material. Alternatively or in addition, the conductive network 20, or at least a part thereof, equally may be fashioned via a fiber construction 28, such as shown in FIG. 2, including one or more conductive fibers 30 intertwined with one or more non-conductive fibers 31 in accordance with any method known for weaving, sewing or knitting to form a flexible, resilient and discrete conductive network 20 integral with the material used to form the garment 10.

Figure 3:
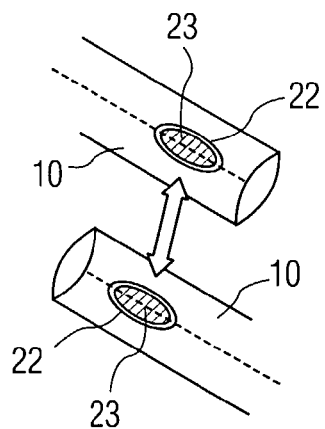
FIG. 3 is a schematic illustration of separate connectors operatively associated with respective garments and suitable for operatively connecting one with another to provide a conductive connection.
Figure 4:
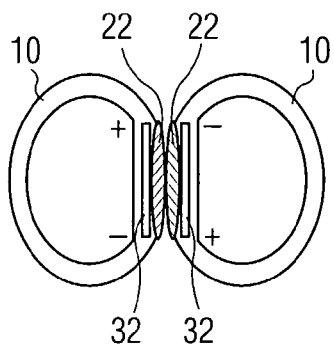
FIG. 4 is a schematic illustration of the connectors of FIG. 3 shown in mating engagement according to an exemplary aspect of present invention.
Figure 5A:
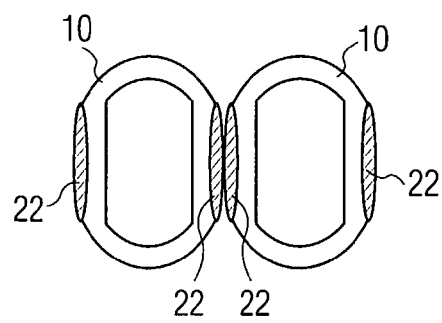
FIG. 5a is a schematic illustration of the connectors of FIG. 3 shown in mating engagement according to another exemplary aspect of present invention.
Figure 5B:
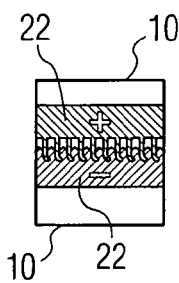

The connection points 22 can take a variety of different forms such as will be readily apparent to those having skill in the pertinent art from the present disclosure. For example, in one aspect of the present disclosure, each connection point 22 can be in the form of a conductive fiber area 23 such as shown in FIG. 3. Each connection point 22 may, for example, be fashioned from a fiber construction similar to the conductive network 20 previously described. That is, with reference again to FIG. 2, a mesh of conductive and non-conductive fibers 30, 31 can be intertwined to fashion a flexible fabric connection point 22. Each connection point 22 may also be formed into a multitude of different patterns facilitating different connection types. For example, as shown in FIG. 4, each connection point 22 can cooperate with one or more magnets 32 operatively associated with the garment 10 so as to allow for easy, fast and disconnectable conductive connections among different connection points 22. FIGS. 5a and 5b demonstrate another exemplary connection type. As shown, each connection point 22 can be a conductive hook and loop (i.e., Velcro™) fiber construction likewise suitable for easy, fast and disconnectable conductive connections between different connection points 22. Each connection point 22 is preferably suitable to conductively cooperate with any of a number of complementary connection points 22 associated with any of a number of complementary garments 10.

Referring again to FIG. 1, as will be readily apparent to those having skill in the pertinent art based on the teachings herein, any one or more of the electronic components 24, which are preferably integral or embedded into the garment 10 so as to be conductively associated with both the conductive network 20 and various connection points 22, may alternatively be releasably associated with the garment 10, conductive network 20, and connection points 22. Consider, for example, components 24r, which are shown as being releasably connect at different locations along the conductive network 20 so as to be conductively connected thereto. An exemplary connection type that may be suitable for facilitating the releasable conductive connection between the respective components 24r and the garment 10 is a conductive fabric interconnecting arrangement similar to that described above with respect to the connection points 22. Any of a variety of other conductive connection types may equally be used.

Figure 6:
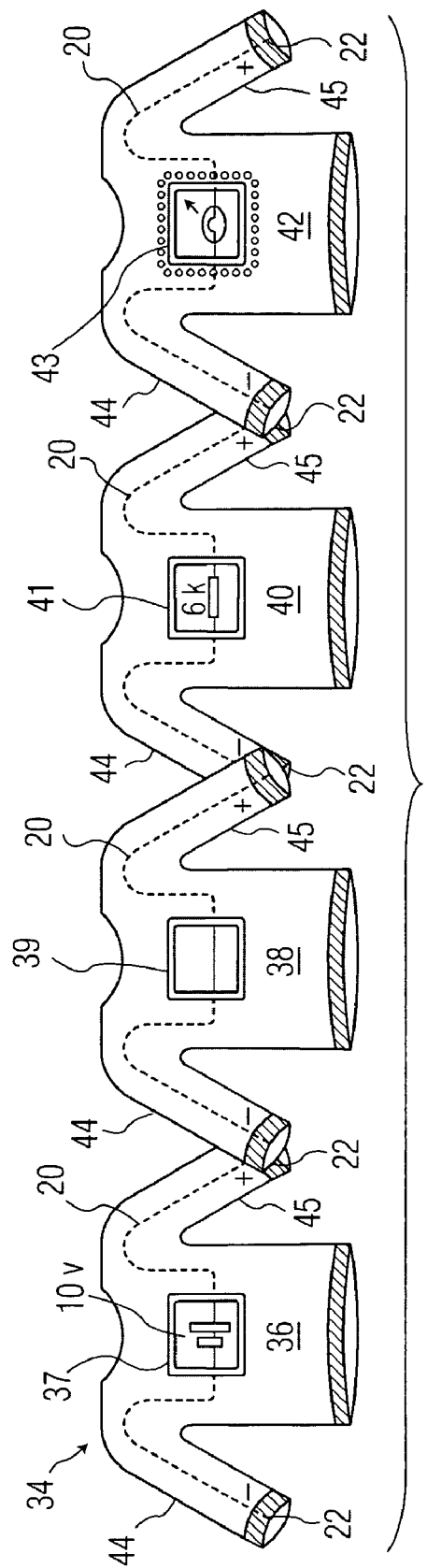
FIG. 6 is a schematic illustration of a set of garments according to another exemplary embodiment of the present invention.
Figure 7:
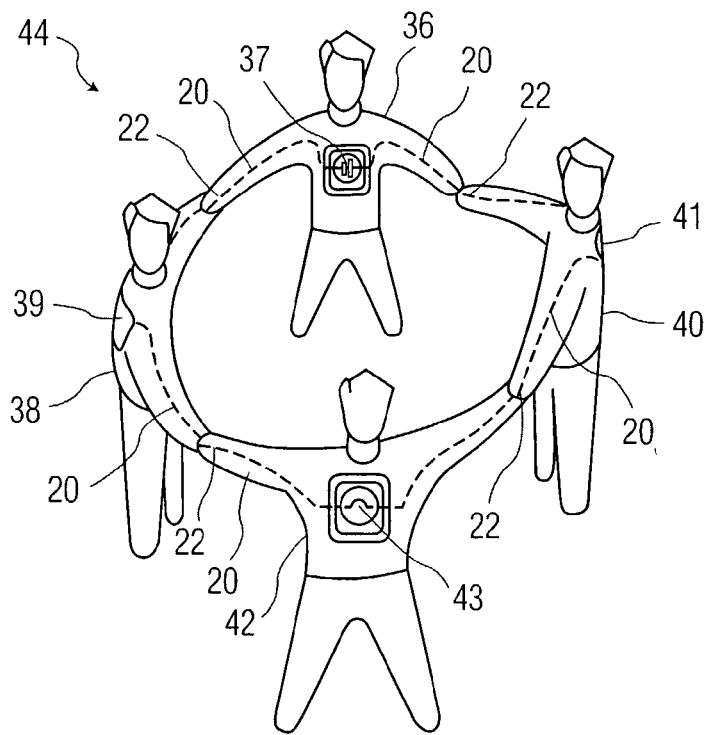
FIG. 7 is a schematic illustration of the set of FIG. 6 in which the system defines a closed circuit.
Figure 8:
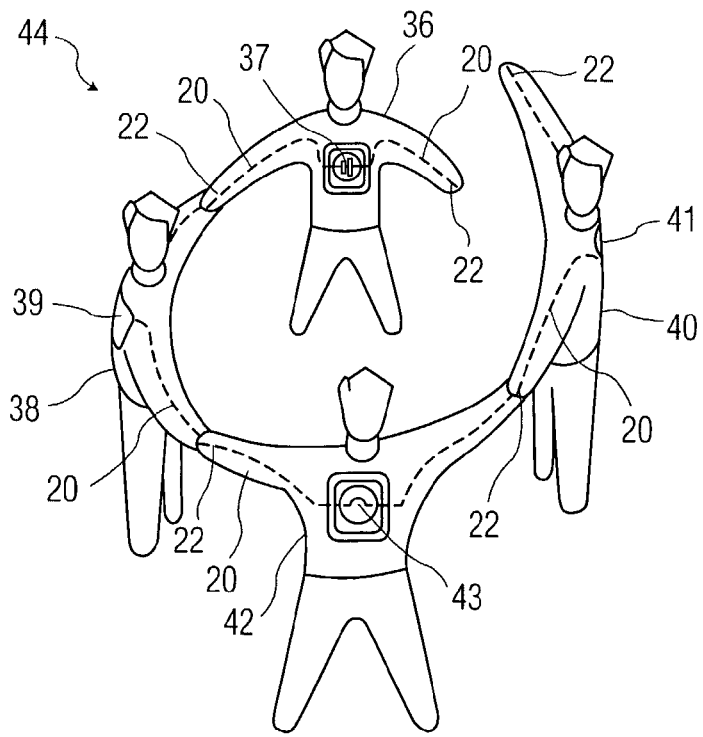
FIG. 8 is a schematic illustration of the set of FIG. 6 in which the system defines an open circuit.

Referring now to FIGS. 6 through 8, any number of the garments of the present invention, in a preferred aspect thereof, can cooperate as a set to define a variety of different circuits capable of performing electrical or electronic functions. In view of this, the set of garments is well suited for use as a training or educational tool/game in demonstrating basic principles of electronic circuits and/or electronic components. Consider, for example the shirt set 34 shown in FIG. 6, which set includes four shirts, a first shirt 36 defining a battery component 37, a second shirt 38 defining a first connecting component 39, a third shirt 40 defining a second connecting component 41, and a fourth shirt 42 defining a light component 43.

Each of the shirts 36, 38, 40, 42 includes the integrated conductive fiber track or conductive network 20 and connection points 22 as previously discussed. The conductive network 20, as shown, extends to the respective sleeves 44, 45 of each shirt 36, 38, 40, 42 with the connection points 22 being likewise associated with each sleeve. Each sleeve 44, 45 may also be marked (e.g., with a "+" or a "−" symbol) so as to facilitate appropriate interconnection with complementary connection points 22 of an adjacent shirt.

The first shirt 36, as shown, represents and operates as the battery component 37 (e.g., a substantially flat rechargeable battery). The battery component is preferably a rechargeable battery that can be recharged by a remote power source (not shown). The battery component 37 preferably has a low profile being relative flat so as to not take up a significant amount of space. The battery component 37 is preferably suitable to provide power to any one or more of the complementary shirts 38, 40 and 42. In an aspect of the present invention, the battery component 37 can be separably connected to a surface of the first shirt 36.

The second shirt 38 represents and operates as, for example, the first connecting component 39. The first connecting component 39 can be any of a variety of electronic connecting elements (e.g., a wire, a switch, a divider, etc.). The first connecting component 39, like the battery component 37, is preferably of a low profile so as to not protrude significantly from the shirt 38. The first connecting component 39 is preferably suitable to conductively connect any two or more of the complementary shirts 36, 40 and 42. Similarly, the first connecting component 39, in an aspect of the present invention, can be separably connected to a surface of the second shirt 38.

The third shirt 40 represents and operates as, for example, the second connecting component 41. The second connecting component 41, distinct from the first connecting element, can have a flow control means (e.g., a resistor, a capacitor, etc.) associated therewith so as to manipulate the conductive flow therethrough. The second connecting component 41, like the first connecting component 39, is preferably suitable to conductively connect any two or more of the complementary shirts 36, 38 and 42. Furthermore, as with each of the previously discussed components 37, 39, the second connecting component 41, in an aspect of the present invention, can be separably connected to a surface of the third shirt 40.

The fourth shirt 42 represents and operates as, for example, the light component 43. The light component 43 can be any of light sources (e.g., LED, luminescent, incandescent, fluorescent, etc.). The light component 43, as with each of the above-noted components 37, 39 and 41, is preferably of a low profile so as to not protrude significantly from the shirt 42. Similarly, the first connecting component 39, in an aspect of the present invention, may be separably connected to a surface of the second shirt 38. The light component 43 illuminates when conductively connected to the battery component 37 via the first and/or second connecting component 39, 41.

As will be readily apparent to those of skill in the pertinent art from the present disclosure, any of a variety of additional and/or alternative shirt or other garment types representing and operating one or more electronic components equally may be utilized in accordance with the present invention and thus, fall within the scope thereof.

With reference now to FIGS. 7 and 8, in an illustrative aspect of the present invention, the shirts 36, 38, 40, 42 can be worn by, for example, four children that may be positioned relative to each other so as to define an operative circuit 44 such as demonstrated in FIG. 7. As shown, the circuit 44 can be created by positioning the children in a circle so that the first shirt 36 or battery component 37 is directly connected to the second and third shirts 38, 40 or connecting components 39, 41 via connection points 22 associated with the respective shirts. The fourth shirt 42 or light component 43, can thus be indirectly connected to the first shirt 36 or battery component 37 via the second and third shirts 38, 40 or connecting components 39, 41 via respective connection points 22 thereof. Once each shirt 36, 38, 40, 42 or component 37, 39, 41, 43 is properly positioned so as to close the circuit 44 the light component 43 illuminates. The circuit 44 can be broken by disconnecting any one or more connection points 22 as, for example, demonstrated in FIG. 8. Thus, the foregoing arrangement can be used to demonstrate the basic principles of an electronic circuit as well as how batteries, light sources and switches operate.

Of course, as will be readily apparent to those skilled in the pertinent art from the present disclosure, any of a variety of other circuits arrangements, both simple and complex, are equally possible. For instance, the garments 10 such as disclosed herein can represent and operate as, antennas, RFID tags, diodes, speakers, or any of a variety of other electronic or electrical components suitable to define and/or demonstrate a variety of different electrical or electronic operations (e.g., radio, variable resistors, calculator, etc.).

It will be understood that the above described embodiment as well as the various aspects and features thereof are merely exemplary and that a person skilled in the art may make many variations and/or modifications without departing from the spirit and scope of the present invention. All such variations and modifications are intended to be included within the scope of the invention as defined in the appended claims.

What is claimed is:

1. A plurality of cooperating interconnectable smart garments to be worn by a plurality of people (10) comprising:
    a conductive network (20) operatively integrated into the garments (10) so as to connect one or more conductive connection points (22), said conductive network (20) including one or more electronic components (24), wherein said interconnectable smart garments represent and operate as said one or more electronic components in a circuit upon interconnection.

2. The smart garments (10) of claim 1, wherein one or more of said connection points (22) are in the form of a conductive area (23) operatively associated with said garment (10).

3. The smart garments (10) of claim 2, wherein said conductive area (23) is defined by a mesh of conductive fibers.

4. The smart garments (10) of claim 2, wherein each of said conductive area (23) has a magnet operatively associated therewith.

5. The smart garments (10) of claim 2, wherein said conductive area (23) is defined by a conductive hook and loop fiber construction.

6. The smart garments (10) of claim 1, wherein each of said one or more connection points (22) are suitable to conductively cooperate with any of a number of complementary connection points (22).

7. The smart garments (10) of claim 1, wherein at least one of said one or more electronic components (24) is releasably associated with said garment (10) so as to be operatively connected to said conductive network and said connection points (22).

8. A modular wearable circuit comprising:
    a set of cooperating interconnectable garments (10) to be worn by a plurality of people having integrated electronic functions associated therewith so that each garment (10) represents and operates as at least one electronic component (24),
    wherein said garments (10) cooperatively connect so as to define different circuits for performing different electronic operations.

9. The modular wearable circuit of claim 8, wherein said set of garments (10) is used for demonstrating principles of electronic circuits and electronic components (24).

10. The modular wearable circuit of claim 8, wherein said set of garments (10) includes different garment types.

11. The modular wearable circuit of claim 10, wherein said garment types are selected from a group consisting of shirts, pants, gloves, or hats, or any combination of the same.

12. The modular wearable circuit of claim 8, wherein each of said garments (10) includes one or more conductive connection points (22) suitable for operatively connecting to one or more other conductive connection points (22) associated with one or more other garments (10).

13. The modular wearable circuit of claim 12, wherein each of said conductive connection points (22) have at least one magnet operatively associated therewith so as to effectuate a conductive connection.

14. The modular wearable circuit of claim 12, wherein each of said conductive connection points (22) is defined by a conductive hook and loop fiber construction.

15. The modular wearable circuit of claim 12, wherein said at least one electronic component is releasably associated with each of said garments (10) so as to be operatively connected to said connection points (22) thereof.

16. The modular wearable circuit of claim 8, wherein some of said garments (10) represent and operate as a connecting component and other of said garments (10) represent and operate as a functioning component.

17. A method of forming an electrical circuit comprising the steps of:
    providing a set of cooperating interconnected garments (10) to be worn by a plurality of people having integrated electronic functions associated therewith such that each garment operates as and represents at least one electronic component (24);
    conductively connecting said garments (10) so as to arrange said electronic components (24) thereof to define an operative circuit.

18. The method of claim 17, wherein each of said garments (10) is worn by one or more individuals.

19. The method of claim 18, wherein each of said individuals are positioned so that said garments (10) can be connected to selectively define said operative circuit.

20. The method of claim 17, wherein some of said garments (10) represent and operate as a connecting component and other of said garments (10) represent and operate as a functioning component.

* * * * *